United States Patent [19]

Idan

[11] Patent Number: 4,665,622

[45] Date of Patent: May 19, 1987

[54] OPTICAL SIGHTING DEVICE

[75] Inventor: Shlomo Idan, Rehovot, Israel

[73] Assignee: Elbit Computers, Ltd., Israel

[21] Appl. No.: 798,998

[22] Filed: Nov. 18, 1985

[51] Int. Cl.⁴ .................. F41G 1/32; G02B 23/10; G02B 27/34
[52] U.S. Cl. ........................ 33/241; 33/246; 356/252
[58] Field of Search .............. 33/241, 246; 350/444, 350/505, 566; 356/251, 252

[56] References Cited

U.S. PATENT DOCUMENTS

| | | | |
|---|---|---|---|
| 2,596,522 | 5/1952 | Bethke | 33/241 |
| 3,182,545 | 5/1965 | Papke | 350/444 |
| 3,813,790 | 6/1974 | Kaltmann | 33/341 |
| 3,833,799 | 9/1974 | Audet | 33/241 |
| 3,963,356 | 6/1976 | Wiklund | 33/241 |
| 3,991,500 | 11/1976 | Kershner et al. | 33/241 |
| 4,266,873 | 5/1981 | Hacskaylo et al. | 33/241 |
| 4,402,605 | 9/1983 | Ekstrand | 356/252 |

FOREIGN PATENT DOCUMENTS

| | | | |
|---|---|---|---|
| 862934 | 3/1941 | France | 356/251 |
| 562233 | 6/1944 | United Kingdom | 356/251 |

*Primary Examiner*—Richard R. Stearns
*Attorney, Agent, or Firm*—Cesari and McKenna

[57] ABSTRACT

An optical sighting device for a rifle or other article to be aimed at a target includes a frame for mounting to the rifle and a very short sighting window atop the frame. A light source in the frame powered by a battery shines a beam of light toward the sighting window which incorporates a retro-collimating beam-splitter so that the marksman sees in the window an image of the reticle in the form of a spot of light superimposed on the target image. When he moves the rifle to place the reticle image at a selected spot on the target image and fires the rifle, the bullets leaving the rifle will strike that spot on the actual target. The sighting device also includes means for adjusting the position of the reticle to compensate for the effects of gravity and wind on the bullets and means for adjusting the relative intensity of the reticle and target images to suit the marksmans preference and to compensate for changes in the ambient light in the vicinity of the sighting device.

9 Claims, 6 Drawing Figures

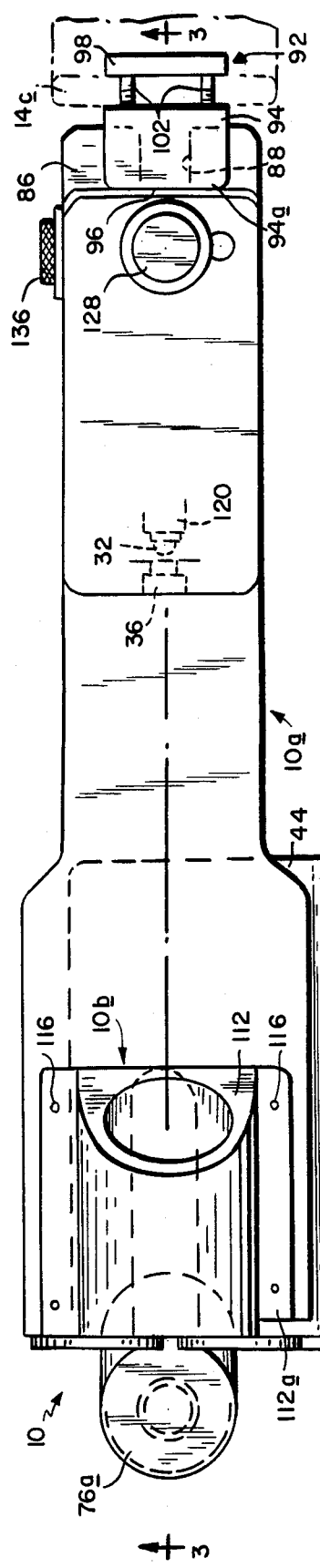
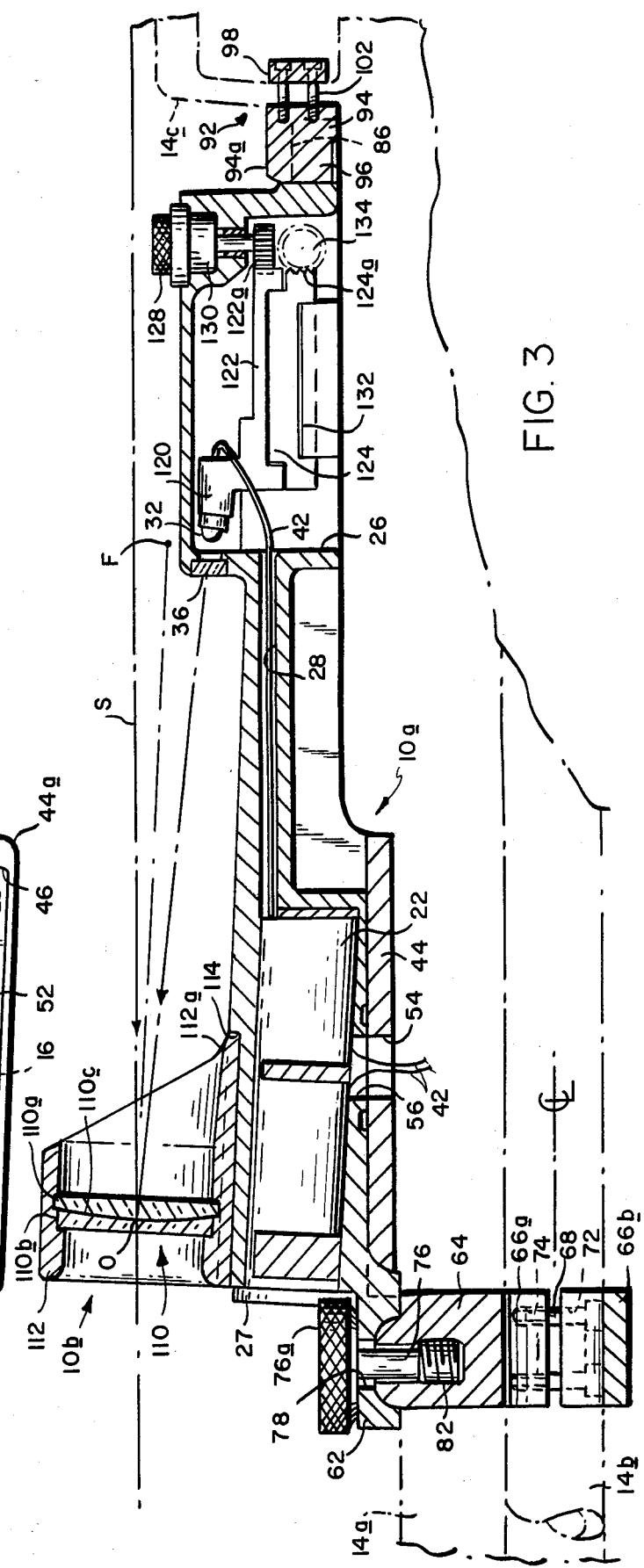
FIG. 2
FIG. 3

OPTICAL SIGHTING DEVICE

The present invention relates to an optical sighting device for use primarily to aim a small firearm such as a rifle or automatic weapon at a target.

BACKGROUND OF THE INVENTION

The task of an optical sighting device on, say, a rifle, is to form a virtual image of an internal reticle superimposed, in all dimensions, on the image of an external target, so as to display to the rifleman the actual aimed-at point on the target. There are two basic types of such a device. The first type is the well-known telescopic sight, in which the reticle is placed at the plane where the objective lens forms the image of the target. The second type is a beam splitter arrangement in which a lens device having a concave semi-silvered surface mirror is provided at a plane forming an angle with a sight line so that a slightly attenuated view of the target is transmitted through the mirror nearly undisturbed. At the same time, a collimated virtual image of an illuminated reticle is reflected by the lens device towards the viewer's eye, the illuminated reticle being located in or adjacent to the focal plane of the mirror surface of the lens device. Thus the mirror suface produces from the light from the reticle, a virtual image which is perceived by the eye of the marksman as a bright spot located far ahead of the lens device and essentially on the external target itself. Examples of such sighting devices are disclosed in U.S. Pat. Nos. 3,942,901 and 4,402,605. The present invention concerns an optical sighting device of this second type.

One great disadvantage of beam-splitter type sighting devices, (and telescopic sights for that matter), is that their optical elements are located inside a relatively long tubular housing mounted to the top of the weapon being aimed. Accordingly, these devices have a very narrow field of view in the order of only 15° or so. As a practical matter, in order to see the target through the sight, the marksman must position his head relative to the rifle so that one eye is located very close to the rear end of the sighting device, his other eye being closed. It will be appreciated, then, that it takes a relatively long time to obtain a bead on a target in this fashion. Furthermore, the fact that the marksman must aim at the target with one eye closed makes it difficult to hold the target in view for any length of time and causes eye strain and fatigue.

Some standard sighting devices are also disadvantaged in that they suffer a certain amount of parallax. Accordingly, when the marksman moves his eye perpendicular to the sighting axis of the device, the illuminated reticle shifts relative to the target, making it very difficult to hit the aimed-at spot on the target.

Some conventional beam-splitter-type sights are also relatively complex and costly to manufacture and they are usually adapted to fit only one specific type of firearm. In other words, it is difficult to retrofit conventional sighting devices to weapons already in the field.

Many standard sights are difficult to use due to several factors. In some, the illuminated reticle has a fixed intensity so that when the target is in bright sunlight, the reticle spot is difficult to see or, when the target is in deep shade, the very bright-appearing spot obscures the aimed-at point on the target. In other sights of this type, it is difficult to adjust the device to compensate for windage and the like.

SUMMARY OF THE INVENTION

Accordingly, the present invention aims to provide an improved optical sighting device of the beam-splitter type.

Another object of the invention is to provide a sighting device of this type which allows a marksman to use both eyes when aiming at a target.

A further object of the invention is to provide an optical sighting device which enables the marksman to aim accurately at a target very quickly, almost instinctively.

Still another object of the objective is to provide a firearm sighting device which has substantially no parallax error.

A further object of the invention is to provide a firearm sighting device that is relatively easy to use over a wide range of different ambient light, wind and weather conditions.

A further object of the invention is to provide such a device which can be accommodated readily to existing firearms.

Other objects will in part be obvious and will in part appear hereinafter.

The invention accordingly comprises the features of construction, combination of elements and arrangement of parts which will be exemplified in the construction hereinafter set forth, and the scope of the invention will be indicated in the claims.

The present optical sighting device is mounted rigidly to the object being aimed. For purposes of this description, we will describe the invention in terms of an optical sight for mounting to an automatic weapon such as the M16 rifle used by some U.S. Military forces. It should be understood, however, that the sight could just as well be affixed to a pistol, crossbow, camera or other device that has to be pointed accurately at a target.

The device includes a hollow frame mounted to the top of the rifle barrel near the rear end of the rifle. Positioned on that frame is a sighting window through which the marksman can view a target area beyond. This viewing window has a relatively large cross-sectional area and it is held in place by an unobtrusive fixture at the forward end of the frame so that the window is spaced appreciably in front of the marksman's eyes when he aims the rifle. Accordingly, the marksman can see the target through the window quite clearly over a relatively wide viewing angle with the result that he can keep both eyes open when aiming the weapon.

The sighting window is actually a lens assembly which includes a semi-silvered concave mirror surface whose major optical axis makes an acute angle with the sighting axis of the device so that the focal point of the mirror is located to the rear of the window directly below the sighting axis. The marksman can thus look through that mirror surface at the target. An illuminated reticle in the form of a tiny lamp is adjustably mounted inside the frame in the focal plane of the mirror surface. The light from the reticle is projected through an aperature in the frame wall toward the mirror surface where a substantial percentage of the light is reflected back along the sighting axis toward the marksman's eyes so that he perceives an image of the reticle, i.e., a small light spot, at a great distance in front of the sighting window. In other words, the bright spot produced by the reticle appears to be superimposed on the target being viewed by the marksman.

In order to aim at a selected spot on a target using this device, the marksman only has to view the target area through the sighting window and position the image of the illuminated reticle at the selected spot on the target image by moving the gun in one direction or another. When the reticle image is superimposed on the selected target spot, the marksman can fire the gun knowing that the bullets will inevitably strike the aimed-at spot on the actual target.

The sighting device also includes provision in its frame for changing the position of the illuminated reticle both vertically and horizontally relative to the focal point of the mirror surface in the viewing window lens assembly. This enables the marksman to adjust the sighting device easily to compensate for the effects of gravity and windage on the bullets being fired from the rifle. There is no need to adjust the position of the entire frame for this purpose as is required in some prior sighting devices of this type. The illuminated reticle is powered by a small battery also contained in the sight frame. To conserve battery power, a normally open switch is connected between the battery and reticle. The switch in incorporated into the side wall of the frame where the marksman normally places his hand when holding the weapon so that the marksman can turn on the reticle quite easily when aiming the gun simply by squeezing the frame.

In a preferred embodiment of the invention, means are provided for varying the intensity of the reticle depending upon the ambient light illuminating the target. By adjusting a manual intensity control built into the frame, the marksman can vary the intensity of the reticle image seen in the sighting window so that he can clearly see the reticle image superimposed on the target image under a variety of different conditions of light and shade. Once the setting is made, a light sensor built into the sight frame responds to any changes in the ambient light to maintain the selected contrast between the reticle and target images that the marksman sees in the sighting window. Consequently when aiming the rifle, he can acquire and hold a selected spot on the target area in a minimum amount of time under different, and changing, ambient light conditions. Yet, with all of the above advantages, the present sight is comparable in cost to conventional devices of this kind. Therefore, it should find wide commercial acceptance.

BRIEF DESCRIPTION OF THE DRAWINGS

For a fuller understanding of the nature and objects of the invention, reference should be had to the following detailed description taken in connection with the accompanying drawings, in which:

FIG. 2 is a top plan view of the FIG. 1 device on a much larger scale;

FIG. 3 is a longitudinal sectional view thereof taken along line 3—3 of FIG. 2, with some parts shown in elevation;

DETAILED DESCRIPTION OF THE PREFERRED EMBODIMENT

Figure 1:
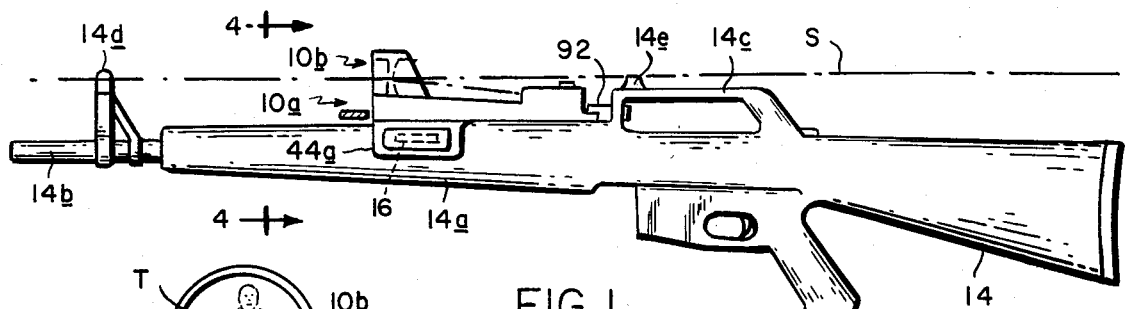
FIG. 1 is an view in side elevation of a rifle equipped with an optical sighting device incorporating the invention.

Refer first to FIG. 1 of the drawings which shows my optical sighting device indicated generally at 10 installed on a weapon 14 which, in the illustration, is an M16 automatic rifle. The sight 10 is mounted to the top of the rifle forestock 14a near the rear end of its barrel 14b and just ahead of the rifle carrying handle 14c. Preferably, device 10 is arranged so that it does not prevent the marksman from aiming the rifle using the standard front and rear sights 14d and 14e incorporated into the rifle at the time of its manufacture.

Figure 1A:
FIG. 1A is a diagrammatic view showing the operation of the FIG. 1 device.

Sight 10 comprises a relatively long frame 10a which is aligned with the gun barrel 14b and a very short sighting window 10b which projects up vertically at the front of frame 14a. When the user holds the rifle so that he can look through the window 10b generally along a sighting axis S, he sees an image of the field of view beyond the window, i.e., an image T of the target area as shown in FIG 1A. When the rifleman presses a leaf-spring switch 16 on the side of frame 10a, the device 10 also superimposes on the target image T in window 10b a spotlike image R, also shown in FIG. 1A, of an illuminated reticle 32 (FIGS. 2 and 3) positioned in frame 10a. The marksman aims rifle 14 at the external target simply by tilting the gun vertically and/or horizontally until the reticle image R is located at the desired spot on the target image T seen in window 14b. When that occurs, the user can fire the gun with assurance that the bullet leaving the rifle will strike that spot on the actual target.

Figure 5:
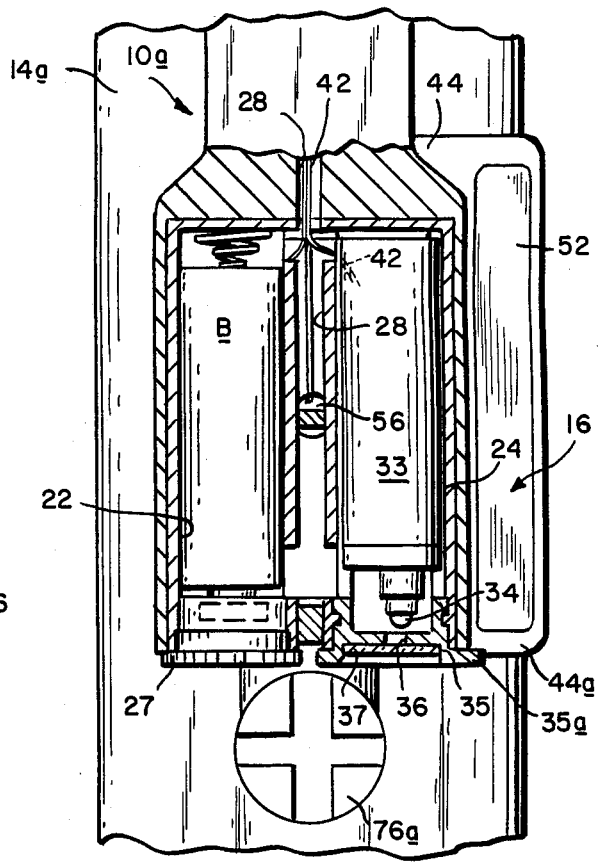

Referring now to FIGS. 2, 3 and 5 of the drawings, frame 10a is actually a hollow enclosure made of a suitable rugged weather-resistant material such as anodized aluminum. The frame includes a pair of side-by-side tubular forward compartments 22 and 24 and a single rear compartment 26, there also being a small passage or feedthrough 28 extending between the forward and rear compartments. The rear compartment 26 contains the reticle 32 which is of a small light source, a LED for example. When the reticle is lit by closing switch 16, it shines through a window or aperature 36 in the forward wall of compartment 26 near the top thereof.

Figure 4:
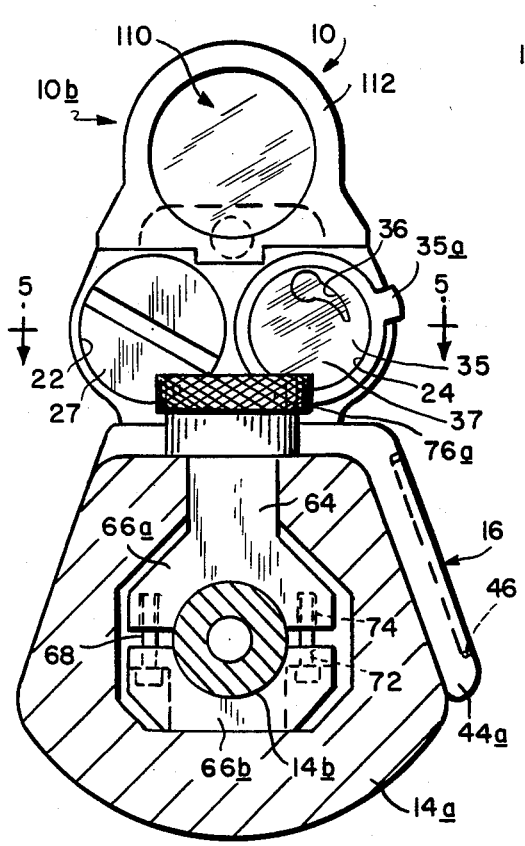
FIG. 4 is a sectional view on a much larger scale along line 4—4 of FIG. 1; and, FIG. 5 is a fragmentary sectional view along line 5—5 of FIG. 4.

The frame forward compartment 22 is open at the front of frame 10a to receive a small battery B for energizing the reticle. After the battery is seated as shown in FIG. 5, the opening into that compartment is closed by a plug 27 that screws into the front wall of the frame 10a. The forward compartment 24 contains means for controlling the intensity of the reticle depending upon the ambient light conditions and the marksman's preference. More particularly, a control circuit 33 is present in this compartment. It includes a photocell 34 which faces the opening into the compartment at the front of frame 10a. That opening is closed by a cap 35 which is rotatively mounted in the compartment 24 wall so that it can be turned by means of a tab 35a projecting from the cap edge. As best seen in FIGS. 4 and 5, a curved aperture 36 is formed in the cap in front of photocell 35 and the width of the aperture varies along its length. The amount of ambient light incident on the photocell through the aperture may thus be varied by rotating cap 35. A transparent disk 37 is recessed into the front face of the cap to prevent dirt from entering the compartment 24 through the aperture. The electrical components in the three frame compartments, as well as switch 16, are connected by appropriate electrical leads 42 that are conducted between the compartments by way of frame passage 28.

Positioned under the forward compartments 22 and 24 of the frame is a flat plate 44 which is fastened to the underside of the frame. Plate 44 has an extension 44a which extends down around the left side of the rifle forestock 14a. As best seen in FIGS. 2 and 4, a large groove or recess 46 is formed in the exposed face of extension 44a which houses the leaf-spring switch 16 that turns reticle 32 on and off. The mouth of recess 46 is closed by a flexible plate 52 which overlies the switch so that when plate 52 is depressed, switch 16 closes and when the plate is released the switch opens. Registering openings 54 and 56 (FIG. 3) are provided in plate 44 and in the bottom wall of frame 10a to accommodate the electrical leads 42 leading to and from the switch 16.

Frame 10a and the plate 44 secured thereto are anchored to the upper surface of the rifle forestock 14a at the front and rear of the frame. More particularly, as shown in FIGS. 2 and 3, an integral tab 62 projects out from the forward end of the frame. Directly under tab 62 is a post 64 which extends up vertically through the rifle forestock which has been predrilled to accommodate the post. The lower end of post 64 is bifuracted with legs that entend down around the upper half of the rifle barrel 14b to form one section 66a of a split ring clamp. The other clamp section 66b engages under the barrel 14b and the two sections are clamped together around the barrel by bolts 68 that extend through appropriate holes 72 in clamp section 66b and are screwed into registering threaded passages 74 in clamp section 66a thereby firmly anchoring post 64 to the rifle barrel 14b. The frame tab 62 overlying post 64 is releaseably secured thereto by a screw 76 which extends through a vertical hole 78 in the tab and is threaded into a vertical passage 82 in post 64 as best seen in FIG. 3. The screw 76 has a rather large knurled head 76a that is accessible for easy turning at the front of device 10.

The securement at the rear end of frame 10a includes a tab 86 that extends out from the rear wall of the frame. The tab has a lengthwise slot or keyway 88 and is clamped to the top of the rifle and, more particularly, to its carrying handle 14c by a clamp assembly 92. As best seen in FIGS. 2 and 3, assembly 92 is composed of a generally L-shaped section 94, one of whose legs 94a overlies tab 86, and is formed with a depending key 96 that engages in the tab slot 88. A second clamp section 98 engages around the front wall of rifle handle 14c from behind and is clamped to section 94 by threaded fasteners 102 which extend through section 96 and are screwed into threaded passages in section 94. When frame 10 is clamped in place as aforesaid, its longitudinal axis is generally parallel to the longitudinal axis of the rifle barrel 14b.

Referring to FIGS. 2 and 3, the sighting window 10b of the device 10 projecting up from frame 10a is a simple lens assembly shown generally at 110. This lens assembly is supported in a short, e.g. one inch long, tubular bracket 112 so that the marksman can see through the lens assembly by looking more or less along the sighting axis S. The bottom wall of the bracket 112 is formed as a flat slab 112a which seats in a recess 114 in the top wall of frame 10a so that the sighting window 10b is aligned with the frame. The bracket is secured to the frame at the four corners of slab 112a by threaded fasteners 116 as best seen in FIG. 2.

Lens assembly 110 comprises a planar-convex mirror 110a, a concavo-plano mirror 110b and a concave, spherical semi-silvered mirror surface 110c sandwiched between the two lenses. The convex face of mirror 110a and the concave face of mirror 110b abut one another, with the surface of mirror 110c, consisting of a very thin semi-reflective layer, disposed as an interface between, and cemented to, the two abutting lens surfaces. The lens assembly 110 is mounted so that its mirror surface 110c faces toward the rear device 10. Thus, mirror 110c functions as a retro-collimating beam splitter. In other words, it is partially transmissive so that the marksman can see through the lens assembly, yet it also reflects a percentage of the incident light. The lens assembly is tilted so that when the collimated beam from the illuminated reticle 32 in frame 10a is incident on mirror 110c at point O, the light is reflected back along the sighting axis S. As is known, if a point of light is placed at the mirror's focal point F, that illuminated point will be reflected by the mirror surface at O and will be projected parallel to the major optical axis O-F of the mirror. Accordingly, the image of the light spot will be perceived by one looking at the mirror 110c as lying a great distance in front of the mirror. As shown in FIG. 3, the reticle 32 is located in the focal plane of the mirror surface 110c. Therefore, the image R (FIG. 1A) of that reticle that is seen in window 10b by the marksman will also appear to lie far in front of device 10 or essentially at the same distance as the target image T seen by him in window 10b.

Lens assembly 110 could be tilted as aforesaid by seating it at an appropriate angle within its bracket 112. Instead, in the illustrated device 10, the lens assembly is mounted in a squared-up fashion within bracket 112 and the upper wall of frame 10a is sloped or slanted so that the entire sighting window 10b is tilted at the proper angle, e.g. 5°, with respect to axis S. The placement of the illuminated reticle 32 well below the axis S removes the reticle from the field of view of the lens assembly 110. Consequently, the reticle does not obstruct the marksman's view of the target through the sighting window 10b.

The two complementary lenses 110a and 110b comprising assembly 110 have essentially the same power so that the lens assembly as a whole has substantially zero magnifying power. Both of the lenses are highly polished to minimize spherical abberation and the two lenses may consist of different materials to correct chromatic abberations. Unwanted reflections are minimized by coating the external lens surfaces of assembly 110 with an anti-reflection coating.

Lens assembly 110 achieves collimation by double refraction of the lens 110a in conjunction with the semi-reflecting mirror surface 110c. Hence, assembly 110 constitutes a retro-collumating doublet. The focal distance of assembly 110 is computed by adding the power of the beam splitting surface 110c to twice the power of the positive lens 110a. The focal distance (f) of a simple planar-convex lens such as lens 110a may be expressed as:

$$f = (R/n - 1) \qquad (1)$$

While the focal distance ($f_T$) of the illustrated doublet 110 may be expressed as:

$$f_T = (R/2n) \qquad (2)$$

Combining equations 1 and 2:

$$f = (2nf_T/n - 1) \tag{3}$$

For most cases, the refractive index $n = 1.5$, so that:

$$f = 6f_T \tag{4}$$

Referring now to FIGS. 2 and 3, the reticle 32 is mounted inside frame compartment 26 so that it can be moved vertically as well as horizontally relative to focal point F in order to align the sighting device 10 with the rifle barrel 14b, as well as to enable the marksman to adjust device 10 to compensate for the effects of gravity and wind on the bullets being fired from the rifle. Although this movable mounting for reticle 32 can be accomplished by a variety of known means, as shown in FIG. 3, the reticle 32 is mounted to a printed circuit card 120 secured to a horizontal slider 122 which is slidably seated on a slide 124. The rear edge of slider 122 is formed as a rack 122a which meshes with a spur gear 126 affixed to the shank of a turnbutton 128 rotatively mounted in a vertical passage 130 in the top wall of frame compartment 26. When the turnbutton 128 is rotated in one direction or the other, the slider 122 and the reticle 32 supported thereon are moved horizontally, i.e., laterally, relative to slide 124. Preferably, the turnbutton 128 includes a conventional detent or lock arrangement which normally locks the button against rotation and requires that the button be pushed before it can be turned.

The lower portion of slide 124 constitutes another slider that is seated in a vertical slide 132. The rear edge 124a of slide/slider 124 is formed as a rack which meshes with a spur gear 134 on the end of the shaft of a turnbutton 136. Turnbutton 136 is similar to button 128 and it is rotatively mounted in the sidewall of housing apartment 26 as best seen in FIG. 2. When turnbutton 136 is pressed inward and rotated in one direction or the other, the slide 124, which supports the slider 122 and the reticle 32, is moved up or down within compartment 26.

To use the present sighting device, the marksman presses the plate 52 with the fingers of his hand that holds the rifle forestock 14a. This pressure closes switch 16 thereby illuminating reticle 32 so that an image R of the reticle is visable to the marksman as he looks at the target through the sighting window 14b. Since the sighting window is very short, and since the lens assembly 110 therein has a relatively wide field of view, i.e., in the order of 15 degrees measured from the sighting axis S, the marksman can view the target image T and reticle image R in the sighting window from a distance and with both eyes open. Therefore, he can quickly aim rifle 14 to place the reticle image R at the selected location on the target image T and fire the rifle, with a more or less continuous slewing motion. It is not necessary for him to position one eye on the sighting axis S, close the other eye and carefully line up the reticle image at the aimed-at spot on the target, as is required with telescopic sights and conventional beam-splitter-type sighting devices. Therefore, the marksman can fire accurately at the target in a minimum amount of time and with minimum eye strain and fatigue.

If the reticle image R is brighter than the rifleman desires, he may rotate cap 35 using its tab 35a so as to reduce the amount of light reaching photodiode 34 through the cap aperture 36; i.e., he rotates cap 35 counterclockwise as viewed in FIG. 4. The control circuit 33 thereupon responds to the changed resistance of the photodiode by decreasing the current applied to reticle 32 so that the reticle intensity, and therefore the image R intensity, is reduced. On the other hand, if the reticle image is too dim, cap 35 may be rotated in the opposite direction, i.e., clockwise, to increase the amount of outside light incident on the photodiode 34. Once the desired contrast between the reticle image R and the field of view in window 10b is set to please the marksman, that same image contrast persists even if the ambient lighting conditions change. In other words, once the cap 35 has been set to a particular position of adjustment, if the ambient light should increase because of cloud dissapation, for example, the amount of light reaching photodiode 34 through aperture 36 will increase. The photocell and circuit 33 will respond to this change by increasing the current applied to reticle 32 so that the reticle becomes brighter. Conversely, if the target area should be shaded for some reason, the light incident on the photocell is reduced and the intensities of the reticle and its image R will be reduced. Thus, there is no need for the marksman to constantly readjust sighting device 10 manually as lighting conditions change. As soon as the marksman no longer intends to fire at the target, he simply releases the pressure on the switch plate 52, thereby turning off the reticle. Consequently, device 10 draws power only when the device is actually being used to aim the rifle, thereby prolonging the life of its battery B.

The above factors and the small size and weight of sighting device 10 makes the device very useful for improving the accuracy of small firearms.

It will thus be seen that the objects set forth above, among those made apparent from the preceding description, are efficiently attained, and since certain changes may be made in the above description without departing from the scope of the invention, it is intended that all matter contained in the above description, or shown in the accompanying drawings, shall be interpreted as illustrative and not in a limiting sense.

It will also be uderstood that the following claims are intended to cover all of the generic and specific features of the invention herein described.

What is claimed as new and desired to be secured by Letters Patent of the United States is:

1. An optical sighting device for a rifle or the like, said device comprising:
   A. a base for mounting to the rifle or the like and defining an interior rear chamber and an exterior sighting window support spaced in front of said chamber;
   B. a sighting window mounted to the support, said window projecting above said rear chamber so that said window has a sighting axis which passes above said rear chamber generally parallel to the axis of the rifle or the like, said window including a retrocollimating beam splitting lens assembly having an optical axis which lies at an acute angle below said sighting axis and passes through said rear chamber;
   C. an electronic reticle mounted in said chamber to form an illuminated spot generally at the focal plane of said lens assembly whereby said lens assembly forms an image of said spot at a generally infinite location in front of said sighting window, said reticle comprising
      1. an aperture in a wall of said rear chamber, said aperture being positioned behind said sighting window below the optical axis of said lens assembly;

2. a light source positioned inside said rear chamber opposite said aperture; and
3. means mounted inside rear chamber for moving said light source in the focal plane of said lens assembly, said moving means including fingeroperable adjustment means extending out of said rear chamber;
D. means supported by said base for powering said reticle; and
E. switch means in circuit with said powering means and said reticle and positioned for switching said reticle on and off.

2. The sighting device defined in claim 1 wherein said lens assembly is an optical doublet comprising a pair of lenses cemented together with a semi-relecting surface sandwiched between said lenses.

3. The sighting device defined in claim 2 wherein said doublet comprises a plano-convex and a plano-concave lens whose curved surfaces abut said semi-reflecting mirror surface.

4. The sighting device in claim 1 wherein said window has a field of view of at least fifteen degrees measured from the sighting axis.

5. The sighting device defined in claim 1 and further including
A. a light sensor in circuit with said light source for varying the intensity of said source; and
B. means including a variable aperture for adjusting the amount of light incident on said light sensor so that the intensity of the light emitted by said light source can be set, thereafter increasing or decreasing with the amount of light passing through said aperture.

6. The sighting device in claim 10 wherein
A. said base also includes a front chamber located under said sighting window;
B. said powering means and said light sensor are located inside said front chamber; and
C. said variable aperture defining means include a portion of the front chamber wall located opposite said light sensor that is movable relative to the light sensor and an aperture in said movable wall portion whose width varies along its extent so that the amount of ambient light incident on said light sensor can be varied by moving said wall portion to position different portions of said aperture opposite said light sensor.

7. The sighting device defined in claim 1 wherein said switch means are mounted to said base under said sighting window.

8. An optical sighting device for a rifle or the like, said device comprising:
A. a base for mounting to the rifle or the like and defining an interior rear chamber and an exterior sighting window support spaced in front of said chamber;
B. a sighting window mounted to the support, said window projecting above said rear chamber so that said window has a sighting axis which passes above said rear chamber generally parallel to the axis of the rifle or the like, said window including a retrocollimating beam splitting lens assembly having an optical axis which lies at an acute angle below said sighting axis and passes through said rear chamber;
C. an electronic reticle including a light source mounted in said chamber to form an illuminated spot generally at the focal plane of said lens assembly whereby said lens assembly forms an image of said said spot at a generally infinite location in front of said sighting window;
D. means supported by said base for powering said light source;
E. switch means in circuit with said powering means and said light source and positioned for switching said light source on and off;
F. a light sensor in circuit with said light source for varying the intensity of said light source; and
G. means including a variable aperture for adjusting the amount of light incident on said light sensor so that the intensity of the light emitted by said light source can be set, thereafter increasing or decreasing with the amount of light passing through said aperture.

9. The sighting device defined in claim 8 wherein
A. said base also includes a front chamber located under said sighting window;
B. said powering means and said light sensor are located inside said front chamber; and
C. said variable aperture defining means include a portion of the front chamber wall located opposite said light sensor that is movable relative to the light sensor and an aperture in said movable wall portion whose width varies along its extent so that the amount of ambient light incident on said light sensor can be varied by moving said wall portion to position different portions of said aperture opposite said light sensor.

* * * * *